United States Patent [19]

Touhsaent

[11] Patent Number: 4,950,544
[45] Date of Patent: Aug. 21, 1990

[54] POLYMER FILM COATED WITH WATER BASED COATING COMPOSITION

[75] Inventor: Robert E. Touhsaent, Fairport, N.Y.

[73] Assignee: Mobil Oil Corporation, New York, N.Y.

[21] Appl. No.: 270,888

[22] Filed: Nov. 14, 1988

Related U.S. Application Data

[62] Division of Ser. No. 905,091, Sep. 8, 1986, Pat. No. 4,785,032.

[51] Int. Cl.$^5$ .............................. B32B 9/04; H04B 1/00
[52] U.S. Cl. ..................................... 428/411.1; 524/44; 524/911; 260/DIG. 15; 260/DIG. 16; 252/500
[58] Field of Search ............... 428/141, 142, 500, 515, 428/516, 517, 532, 411.1; 524/911, 44; 260/DIG. 15, DIG. 16; 252/500, 1

[56] References Cited

U.S. PATENT DOCUMENTS

| | | | |
|---|---|---|---|
| 2,063,987 | 12/1936 | Dreyfus | 252/8.8 |
| 2,678,285 | 5/1954 | Browning | 428/151 |
| 2,832,696 | 4/1958 | Walles | 428/516 |
| 2,832,697 | 4/1958 | Walles | 428/516 |
| 2,832,698 | 4/1958 | Walles | 428/516 |
| 2,832,699 | 4/1958 | Walles | 428/516 |
| 2,937,066 | 5/1960 | Walles | 8/513 |
| 3,252,826 | 5/1966 | Salzinger | 428/509 |
| 3,365,435 | 1/1968 | Adams et al. | 524/249 |
| 3,365,437 | 1/1968 | Marra et al. | 524/223 |
| 3,407,187 | 10/1968 | Savides et al. | 524/156 |
| 3,445,396 | 5/1969 | Funatsu et al. | 524/249 |
| 3,485,786 | 12/1969 | Rombusch et al. | 524/246 |
| 3,575,902 | 4/1968 | Tsou | 106/308 M |
| 3,631,162 | 12/1971 | McGaugh et al. | 524/244 |
| 3,708,464 | 1/1973 | Rombusch et al. | 524/100 |
| 3,821,184 | 6/1974 | Ruter et al. | 524/100 |
| 3,975,325 | 8/1976 | Long, Jr. | 524/249 |
| 4,140,822 | 7/1979 | Dratz | 427/393.5 |
| 4,147,742 | 4/1979 | Castro et al. | 524/223 |
| 4,210,556 | 7/1980 | Castro et al. | 524/249 |
| 4,234,664 | 11/1980 | Hendy | 428/520 |
| 4,241,144 | 12/1980 | Hendy | 428/516 |
| 4,268,583 | 5/1981 | Hendy | 428/516 |
| 4,314,040 | 2/1982 | Castro et al. | 524/249 |
| 4,420,530 | 12/1983 | Toyoda et al. | 428/323 |
| 4,596,668 | 6/1986 | Berbeco | 252/500 |

FOREIGN PATENT DOCUMENTS 0114503 8/1984 European Pat. Off.

Primary Examiner—Nathan M. Nutter
Attorney, Agent, or Firm—Alexander J. McKillop; Charles J. Speciale

[57] ABSTRACT

A water based antistatic coating composition comprising:
(a) at least one water soluble antistatic agent which is acceptable for food packaging polymer films;
(b) at least one water soluble or water dispersible film-forming polymer; and,
(c) a solution or dispersion-forming amount of water.

When applied to a polymer film substrate, the foregoing antistatic coating composition forms, upon drying, and adherent antistatic coating.

12 Claims, No Drawings

POLYMER FILM COATED WITH WATER BASED COATING COMPOSITION

This is a divisional of copending application Ser. No. 905,091, filed on Sept. 8, 1986, now U.S. Pat. No. 4,785,032.

BACKGROUND OF THE INVENTION

This invention relates generally to a water based antistatic coating composition and, in particular, to polymer films treated with an antistatic composition.

U.S. Pat. No. 2,063,987 describes the acylated and/or esterified derivatives of aliphatic amino carboxylic acids and the salts of these derivates formed on the amino group or the carboxylic acid group, whichever is free, as aqueous treating agents, in particular, for wetting, cleansing, sizing, de-electrification, prevention of acid fading of dyestuffs, creping and other treatments of textile filaments, threads, yarns, fabrics, etc. At present, N-acyl derivatives of N-methyl glycine (sarcosine) where the acyl group is lauroyl, oleoyl or derived from the combined fatty acids of coconut oil are approved as antistatic and/or as antifogging agents in polyolefin films used for packaging meat, fresh fruits and fresh vegetables (21 C.F.R. 178.3280). Similar approval is given for the use of N,N-bis(2-hydroxyethyl)higher aliphatic amines.

U.S. Pat. No. 2,678,285 describes treating the surface of a polymer film with an antistatic agent, specifically, an aqueous solution of a surface active agent such as triethanolamine stearate containing a finely divided polymeric material and, optionally, a wax.

U.S. Pat. Nos. 2,832,696, 2,832,697, 2,832,698, 2,832,699 and 2,937,066 each describe antistatic agents for polymeric materials including, for example, in the case of U.S. Pat. No. 2,832,696, fatty amide condensate. Still other disclosures of polymer antistatic components are: U.S. Pat. Nos. 3,365,435 (N-(2-hydroxyalkyl)ethanolamine), 3,365,437 (hydroxyalkyl fatty acid amide), 3,407,187 (quaternary alkyl ammonium compound), 3,445,396 (a combination of N,N-bis(2-hydroxyethyl)higher aliphatic amine and higher aliphatic alcohol), 3,485,786 (alkyl propylamine), 3,575,902 (ethoxylated amine), 3,631,162 (a combination of N-(2-hydroxy-3-dodecyloxypropyl)ethanolamine and N,N-bis(2-hydroxyethyl)alkylamine), 3,708,464 (tetrahydropyrimidine), 3,821,184 (tetrahydropyrimidine), 3,975,325 (a combination of a fatty acid salt and tertiary amine), 4,147,742 (ethoxylated amine), 4,210,556 (ethoxylated amine), 4,234,664 (quaternary ammonium salt), 4,241,144 (quaternary ammonium sulfate), 4,268,583 (quaternary ammonium salt) and 4,314,040 (ethoxylated amine).

Aqueous film-forming compositions containing, in addition to a water soluble or water dispersible film-forming polymer, one or more ingredients intended to impart a particular property or characteristic to the substrate to which the compositions are applied are known. Thus, U.S. Pat. No. 3,252,826 describes a polymer film coated with an aqueous coating composition containing a water soluble gum, polyvinyl alcohol, hydroxyethyl cellulose, carboxy methyl cellulose, agar, etc., and an alkali metal salt of a fatty acid to confer clarity, good slip and good anti-block characteristics upon the film. U.S. Pat. No. 4,140,822 describes a polyolefin film coated with an aqueous dispersion comprising aluminum chlorhydroxide, phosphoric acid and high molecular weight polyvinyl alcohol to enhance the receptivity of the film surface for paint, ink and glue. U.S. Pat. No. 4,596,668 discloses an electrically-conductive surface-coating composition for use as a floor coating to provide electrostatic discharge protection. The composition comprises an emulsion of a film-forming, water soluble, low molecular weight polyampholyte polymer containing free carboxylic groups and carboxylic amino ester groups and an antistatic agent such as a quaternary ammonium salt.

SUMMARY OF THE INVENTION

It is an object of the present invention to provide an antistatic coating composition for application to polymer film.

It is a particular object of the invention to provide a water based antistatic coating composition containing an antistatic agent which is acceptable for food packaging polymer films.

In keeping with the foregoing objects there is provided in accordance with this invention a water based antistatic coating composition comprising:

(a) at least one water soluble antistatic agent which is acceptable for food packaging polymer films;

(b) at least one water soluble or water dispersible film-forming polymer; and, (c) a solution or dispersion-forming amount of water.

When applied to a polymer film substrate, the foregoing antistatic coating composition forms, upon drying, an adherent antistatic coating.

DESCRIPTION OF THE PREFERRED EMBODIMENTS

Of the water soluble antistatic agents which are acceptable for use with food packaging films and as such can be used to provide the antistatic coating composition of this invention, the N-acyl sarcosinates and their salts and the N,N-bis(2-hydroxyethyl)higher aliphatic amines are preferred.

The useful N-acyl sarcosinates can be represented by the general formula

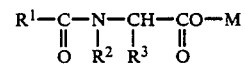

wherein $R^1$ is an alkyl radical of from 8 to about 22 carbon atoms, $R^2$ is hydrogen, methyl or ethyl, $R^3$ is hydrogen, alkyl of 1 to 4 carbon atoms, hydroxyalkyl of 1 to 4 carbon atoms and M is hydrogen or a salt-forming moiety such as alkali metal, ammonium or propanol substituted ammonium.

The N-acyl sarcosinates can be prepared by a variety of methods including those described in U.S. Pat. No. 2,063,987 referred to above and U.S. Pat. Nos. 2,729,657, 3,074,980 and 3,836,551. Some are commercially available such as Hamposyl L-30 (W.R. Grace), a 30% by weight aqueous solution of sodium lauryl sarcosinate which, in addition to its antistatic capabilities, can also function as a slip agent when applied to polymer film surfaces.

The useful N,N-bis(2-hydroxyethyl)higher aliphatic amines can be represented by the general formula

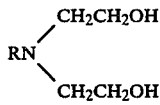

wherein R is an alkyl or alkenyl group of from 8 to about 22 carbon atoms. Particularly preferred are N,N-bis(2-hydroxyethyl)alkenyl or mixtures of alkenyl and alkyl ($C_{12-18}$) amines obtained from distilled coco, soy, oleyl or tallow, or mixtures thereof. Armostat 310 (Armak Company), a diethoxylated tallow (mixed alkenyl and alkyl) amine has been used with good results.

The polymeric component of the antistatic coating composition of this invention is preferably one which is soluble or dispersible in water at ambient temperature. Suitable polymers include the homopolymers of acrylamide and methacrylamide; the copolymers of acrylamide and methacrylamide with each other and/or with one or more other monomers such as acrylic acid, methacrylic acid, vinyl alcohol (from hydrolysis of interpolymerized vinyl acetate groups), vinyl acetate, etc.; polyethylene sulfonate; polyesters such as maleinized polyesters, hydrophilic polyesters and polyesters modified with high-functionality organic acids; polymethacrylic acid; polyvinylpyrrolidone; polyvinylmethyl ether; cellulose ethers such as methyl cellulose, ethyl methylcellulose, sodium carboxymethylcellulose, hydroxypropyl methylcellulose, hydroxyethylcellulose, carboxymethyl hydroxyethylcellulose; and natural gums, soluble starches and other natural water soluble film-forming polymers. The foregoing recitation is not intended to be exhaustive but merely representative of the many kinds of water soluble and water dispersible film-forming polymers which are useful herein. Of these polymers, the cellulose ethers are preferred with hydroxyethylcellulose (HEC) being especially preferred. The preferred cellulose ethers are generally acceptable for use in food packaging polymer films.

If desired, once the coating compositions are applied, the polymer component can be insolubilized. Thus, for example, sodium carboxymethylcellulose can be insolubilized by treatment with aluminum sulfate or with other polyvalent metal ions.

The amounts of antistatic agent, water soluble or water dispersible film-forming polymer, optional ingredients such as natural or synthetic wax, surface active agent, particulate such as talc (an antiblocking agent) and colloidal silica (to reduce the coefficient of friction), suspending agent, viscosity modifier, pH adjustor, etc., and water can vary over wide ranges. In general, the amount of antistatic agent should be such that when the coating composition is applied to a polymer film, a significant reduction in the tendency of the film to accumulate static electricity on a surface thereof will be achieved. Amounts of antistatic agent ranging from about 1% to about 99%, and preferably from about 25% to about 75%, weight percent of the total coating composition are usually suitable. When applied to a film surface, coating compositions containing such amounts of antistatic agent will be sufficient to lay down from about 0.01 to about 1g/1000 in², and preferably from about 0.03 to about 1g/1000 in.² of the antistatic agent.

The polymer must be employed in at least that amount which will provide a continuous adherent coating when applied to a polymer film surface. The precise amounts will vary depending upon the nature of the polymer, the nature and amount of antistatic agent and other factors readily appreciated by those skilled in the art. From about 1% to about 99%, and preferably from about 25% to about 75% weight percent polymer, can be employed with good results.

Optional ingredient(s), when present, can be employed in the customary amounts.

The total solids content of the coating composition herein can vary widely, e.g., from about 1 to about 20, and preferably from about 2 to 10, weight percent of the total, the balance being water or a mixture of water and a water soluble organic solvent such as methanol, ethanol, etc., to accelerate drying.

The polymer films to be coated with the foregoing water based antistatic coating compositions are, of course, those which tend to accumulate surface electric charges during manufacture and/or while in service. Suitable polymer films include olefin polymers, e.g., homopolymers and copolymers of ethylene, propylene and butene-1; polyvinyl chloride, vinyl chloride/vinylidene chloride copolymers; polystyrene; styrene/butadiene copolymers; polyvinyl acetate, ethylene-vinyl acetate copolymer, ethylene-vinyl acetate-vinyl alcohol terpolymer, and the like.

Films encountered in the packaging and handling of foods, notably, oriented polypropylene and vinyl acetate-containing homopolymers and copolymers, are especially well suited for coating by the antistatic coating compositions herein. When, however, the polymer film need not be acceptable for food packaging application, the coating composition can contain essentially any antistatic agent which is suitable for application to the surface of a substrate resin. Thus, any of the known antistatic compositions including many of those referred to above can be employed in coating compositions to be applied to films intended for non-food use.

The following examples are illustrative of antistatic coating compositions prepared in accordance with this invention and oriented polypropylene film coated therewith.

EXAMPLES 1-2

Two water based antistatic coating compositions were formulated as shown in Table I and applied to polypropylene film prior to orientation in the transverse direction.

TABLE I

| | Water Based Antistatic Coating Compositions | | | | | |
|---|---|---|---|---|---|---|
| | Wt. % | Solution Wt.(g) | | Dry Wt.(g) | | Wt. % on a dry basis |
| Component | Sol. | Ex.1 | Ex.2 | Ex.1 | Ex.2 | Ex.1 | Ex.2 |
| Hydroxyethyl cellulose (Cellosize WP-3, Union Carbide) | 3.0 | 100.0 | 100.0 | 3.0 | 3.0 | 63.2 | 52.2 |
| Diethoxylated amine (Armostat 310, Armak Company)* | 2.0 | 50.0 | — | 1.0 | — | 21.0 | — |
| Sodium lauroyl sarcosinate (Sarkosyl NL-30, Ciba-Geigy) | 30.0 | — | 6.7 | — | 2.0 | — | 34.8 |
| Carnauba wax emulsion | 25.0 | 2.0 | 2.0 | 0.5 | 0.5 | 10.5 | 8.7 |
| Talc | 10.0 | 2.5 | 2.5 | .25 | .25 | 5.3 | 4.3 |
| Water (demineralized) | — | 50.0 | 93.3 | — | — | — | — |
| Total | — | 204.5 | 204.5 | 4.75 | 5.75 | 100.0 | 100.0 |
| Application, | — | 2.3 | 2.8 | — | — | — | — |

TABLE I-continued

| | | Water Based Antistatic Coating Compositions | | | | | |
|---|---|---|---|---|---|---|---|
| | | Solution Wt.(g) | | Dry Wt.(g) | | Wt. % on a dry basis | |
| Component | Wt. % Sol. | Ex.1 | Ex.2 | Ex.1 | Ex.2 | Ex.1 | Ex.2 |
| Wt. % Solids | | | | | | | |

*Diluted with water and acetic acid to pH 5 and 2 wt. % solids.

The properties of the films coated with the antistatic coating compositions are set forth in Table II as follows:

TABLE II

| Properties of Polypropylene Film Coated With Antistatic Composition | | |
|---|---|---|
| Property | Example 1 | Example 2 |
| Coefficient of Friction | .23 | .13 |
| Blocking (g/in.) | 0.8 | 0.8 |
| Haze, % | 2.6 | 3.4 |
| Gloss, % | 94.3 | 91.7 |

EXAMPLES 3-20

The antistatic coating compositions of these examples were prepared with 0 (control), 25, 50, 75 and 100 wt.% sodium lauroyl sarcosinate antistatic agent (Hamposyl L-30, W.R. Grace) and hydroxyethyl cellulose (Cellosize QP-09, Union Carbide) and diluted with demineralized water to 2, 3.5 and 5 wt.% solids. The compositions were applied to the base polypropylene film with a 200 Q gravure roll. Static tests, coefficient of friction and blocking measurements and coating weights are set forth in Table III as follows:

TABLE III

| | | | Water Based Antistatic Coating Compositions And Properties Of Polypropylene Film Coated Therewith | | | | | |
|---|---|---|---|---|---|---|---|---|
| Example | Antistatic Agent (Wt. %) | Wt. % Sol. | Initial Charge (Kv) | 3 Min. Charge (Kv) | Half-life (min.) | Coefficient of Friction | Blocking (g/in.) | Coating Wt. (g/1000 in.$^2$) |
| 3 | 0 | 5.0 | 5.00 | 2.15 | 0.98 | 0.76 | 154.0 | 0.0931 |
| 4 | 0 | 3.5 | 5.65 | 3.00 | 2.33 | 0.48 | 127.5 | 0.0486 |
| 5 | 0 | 2.0 | 5.95 | 3.20 | >3.00 | 0.45 | 130.0 | 0.0264 |
| 6 | 100 | 2.0 | 5.95 | 2.68 | 1.75 | 0.19 | 3.2 | 0.0139 |
| 7 | 100 | 3.5 | 5.40 | 2.25 | 0.78 | 0.17 | 0.0 | 0.0292 |
| 8 | 100 | 5.0 | 5.80 | 2.80 | 1.83 | 0.15 | 0.0 | 0.0389 |
| 9 | 50 | 5.0 | 4.35 | 0.00 | 0.40 | 0.16 | 6.1 | 0.0611 |
| 10 | 50 | 3.5 | 4.85 | 0.00 | 0.10 | 0.17 | 11.3 | 0.0375 |
| 11 | 50 | 2.0 | 5.40 | 0.00 | 0.13 | 0.20 | 11.4 | 0.0236 |
| 12 | 75 | 2.0 | 5.60 | 1.13 | 0.58 | 0.19 | 0.0 | 0.0194 |
| 13 | 75 | 3.5 | 5.75 | 0.18 | 0.30 | 0.17 | 0.0 | 0.0264 |
| 14 | 75 | 5.0 | 4.65 | 0.10 | 0.35 | 0.20 | 0.0 | 0.0403 |
| 15 | 25 | 5.0 | 4.15 | 0.05 | 0.07 | 0.17 | 15.9 | 0.0750 |
| 16 | 25 | 3.5 | 4.60 | 0.00 | 0.04 | 0.21 | 22.4 | 0.0431 |
| 17 | 25 | 2.0 | 5.25 | 0.00 | 0.18 | 0.31 | 35.9 | 0.0292 |
| 18 | 0 | 3.5 | 6.75 | 3.88 | >3.00 | 0.77 | 146.7 | 0.0584 |
| 19 | 100 | 3.5 | 5.80 | 2.98 | 2.00 | 0.21 | 0.8 | 0.0375 |
| 20 | 50 | 3.5 | 5.10 | 0.00 | 0.15 | 0.20 | 10.6 | 0.0445 |

What is claimed is:

1. A polymer film possessing a substantially continuous, adherent coating of antistatic agent on at least one major surface thereof, the coating being applied to said film surface as a water based composition comprising:
   (a) at least one water soluble antistatic agent which is selected from the group consisting of N-acyl sarcosinates and N, N-bis-(2-hydroxyethyl) higher aliphatic amines;
   (b) at least one water soluble or water dispersible film-forming polymer; and
   (c) a solution of dispersion-forming amount of water.

2. The polymer film of claim 1 wherein the film contains is a polyolefinic film component.

3. The polymer film of claim 1 wherein the film contains a polypropylene film component.

4. The polymer film of claim 1 wherein the antistatic agent is one which is acceptable for food packaging polymer film.

5. The polymer film of claim 4 wherein the antistatic agent is a compound of the general formula

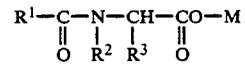

wherein $R^1$ is an alkyl radical of from 8 to about 22 carbon atoms, $R^2$ is hydrogen, methyl or ethyl, $R^3$ is hydrogen, alkyl of 1 to 4 carbon atoms hydroxyalkyl of 1 to 4 carbon atoms and M is hydrogen or a salt-forming moiety.

6. The polymer film of claim 5 wherein the salt-forming moiety is an alkali metal, ammonium or propanol substituted ammonium.

7. The polymer film of claim 5 wherein the antistatic agent is is alkali metal alkyl sarcosinate.

8. The polymer film of claim 5 wherein the antistatic agent is sodium lauryl sarcosinate.

9. The polymer film of claim 5 wherein the antistatic agent is a compound of the general formula

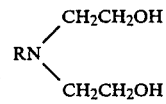

wherein R is an alkyl or alkenyl group of from 8 to about 22 carbon atoms.

10. The polymer film of claim 5 wherein the antistatic agent is an N,N-bis(2-hydroxyethyl)alkenyl or mixture of alkenyl and alkyl ($C_{12-18}$) amines.

11. The polymer film of claim 5 wherein the water soluble or water dispersible film-forming polymer is a cellulose ether.

12. The polymer film of claim 5 wherein the water soluble or water dispersible film-forming polymer is a hydroxyethyl cellulose.

* * * * *